(12) United States Patent
Wunderlin

(10) Patent No.: US 9,873,477 B2
(45) Date of Patent: Jan. 23, 2018

(54) COLLAPSIBLE SCOOTER

(71) Applicant: Matthias Wunderlin, Lausen (CH)

(72) Inventor: Matthias Wunderlin, Lausen (CH)

(*) Notice: Subject to any disclaimer, the term of this patent is extended or adjusted under 35 U.S.C. 154(b) by 18 days.

(21) Appl. No.: 15/046,517

(22) Filed: Feb. 18, 2016

(65) Prior Publication Data
US 2017/0240241 A1 Aug. 24, 2017

(51) Int. Cl.
*B62K 15/00* (2006.01)
*B62M 7/12* (2006.01)
*B62K 21/24* (2006.01)
*B62J 25/00* (2006.01)

(52) U.S. Cl.
CPC ............ *B62K 15/008* (2013.01); *B62J 25/00* (2013.01); *B62K 21/24* (2013.01); *B62M 7/12* (2013.01)

(58) Field of Classification Search
CPC ........ B62K 15/008; B62K 21/24; B62J 25/00; B62M 7/12
See application file for complete search history.

(56) References Cited

U.S. PATENT DOCUMENTS

| | | | | |
|---|---|---|---|---|
| 591,306 A * | 10/1897 | Tolson | ............... | B62K 25/04 280/283 |
| 3,990,717 A * | 11/1976 | Best | ............... | B62K 15/008 280/278 |
| 4,202,561 A * | 5/1980 | Yonkers | ............... | B62K 15/008 280/278 |
| 4,429,890 A * | 2/1984 | Hon | ............... | B62K 15/006 280/259 |
| 5,836,602 A * | 11/1998 | Wang | ............... | B62K 15/008 280/278 |
| 6,116,629 A * | 9/2000 | Koppensteiner | ............... | B62K 25/005 280/278 |
| 6,293,575 B1 * | 9/2001 | Burrows | ............... | B62K 15/006 280/278 |
| 6,595,536 B1 * | 7/2003 | Tucker | ............... | B62K 15/00 280/278 |
| 6,595,539 B1 * | 7/2003 | Belli | ............... | B62K 15/008 280/278 |
| 6,942,235 B2 * | 9/2005 | Chang | ............... | B62K 15/00 280/278 |
| 7,527,276 B2 * | 5/2009 | Schmautz | ............... | B62J 25/00 280/200 |
| 7,540,517 B2 * | 6/2009 | Wernli | ............... | B62K 5/08 280/267 |
| 8,414,007 B2 * | 4/2013 | Chen | ............... | B62K 9/00 280/278 |
| 9,033,089 B2 * | 5/2015 | Theodore | ............... | B62D 31/006 180/208 |
| 2003/0030245 A1 * | 2/2003 | Janssen | ............... | B62M 1/26 280/259 |
| 2005/0263979 A1 * | 12/2005 | Sinclair | ............... | B62K 15/006 280/278 |

(Continued)

*Primary Examiner* — Darlene P Condra
(74) *Attorney, Agent, or Firm* — Mitchell Law PLLC; Matthew W. Mitchell

(57) ABSTRACT

An electric scooter is disclosed that includes a concaved-shaped center frame comprising a first and second curved members, a concaved-shaped rear frame hingebly attached to the center frame about a first axis, a front frame portion hingeably attached to the center frame about a second axis perpendicular to the first axis, and support cables coupled at a first end to the front frame portion and at a second end to the rear frame.

19 Claims, 19 Drawing Sheets

(56) References Cited

U.S. PATENT DOCUMENTS

| | | | |
|---|---|---|---|
| 2008/0023936 A1* | 1/2008 | Mihelic | B62K 15/00 280/287 |
| 2011/0025016 A1* | 2/2011 | Waaijer | B62H 5/003 280/287 |
| 2014/0077474 A1* | 3/2014 | Priest | B62K 15/008 280/278 |

* cited by examiner

COLLAPSIBLE SCOOTER

TECHNICAL FIELD

This disclosure relates to a scooter, and more particularly to a collapsible scooter configured for selective collapsing into a compact structure.

BACKGROUND

The statements in this section merely provide background information related to the present disclosure and may not constitute prior art.

Bicycles and scooters are ubiquitous vehicles, widely utilized for leisure, sport, and transportation. While most bicycles and scooters are manually powered and operated, some known bicycles and scooter vehicles use electronic motors to propel or supplement manual power. However, most of the known electronic bicycles and scooters are bulky, having been designed for riding comforts and operation and not designed for convenient handling and storage features. Handling and storage are particular problematic in urban environments by individuals who live in a confined apartments or traveling situations such as commuting or commercial airplane travel.

Therefore, it would be advantageous to provide a collapsible scooter configured for selective collapsing into a compact structure for convenient handling and storage.

SUMMARY

A scooter apparatus is disclosed having features configured for selective collapsing into a compact structure for convenient handling and storage. The electric scooter includes a concaved-shaped center frame comprising a first and second curved members, a concaved-shaped rear frame hingebly attached to the center frame about a first axis, a front frame portion hingeably attached to the center frame about a second axis perpendicular to the first axis, and support cables coupled at a first end to the front frame portion and at a second end to the rear frame.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
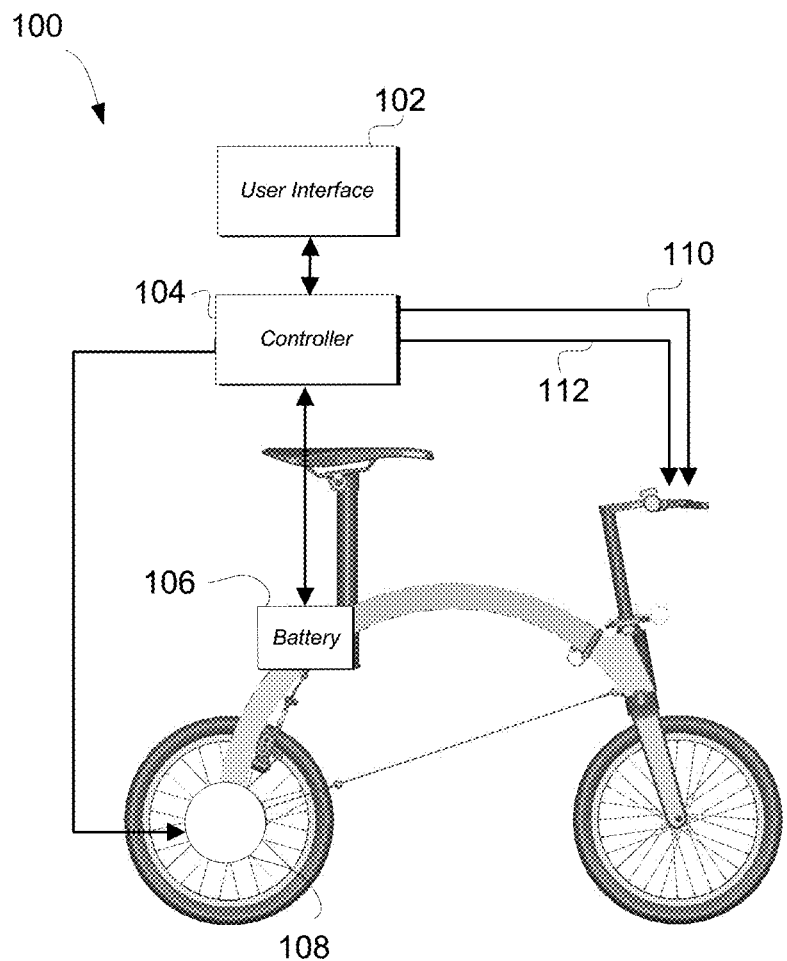
FIG. 1 is a partial schematic block diagram showing the interrelationship of the various components of an exemplary drive system of an electric scooter, in accordance with the present disclosure.
Figure 2:
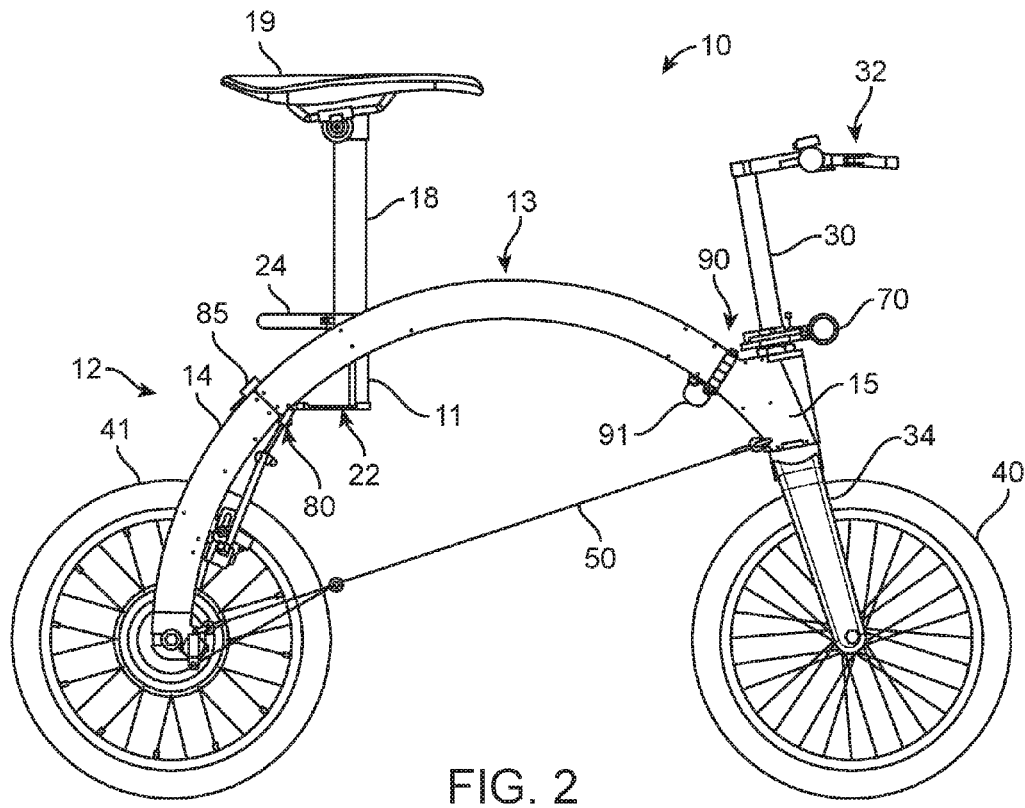
FIG. 2 is a left side view of the electric scooter, in accordance with the present disclosure.
Figure 3:
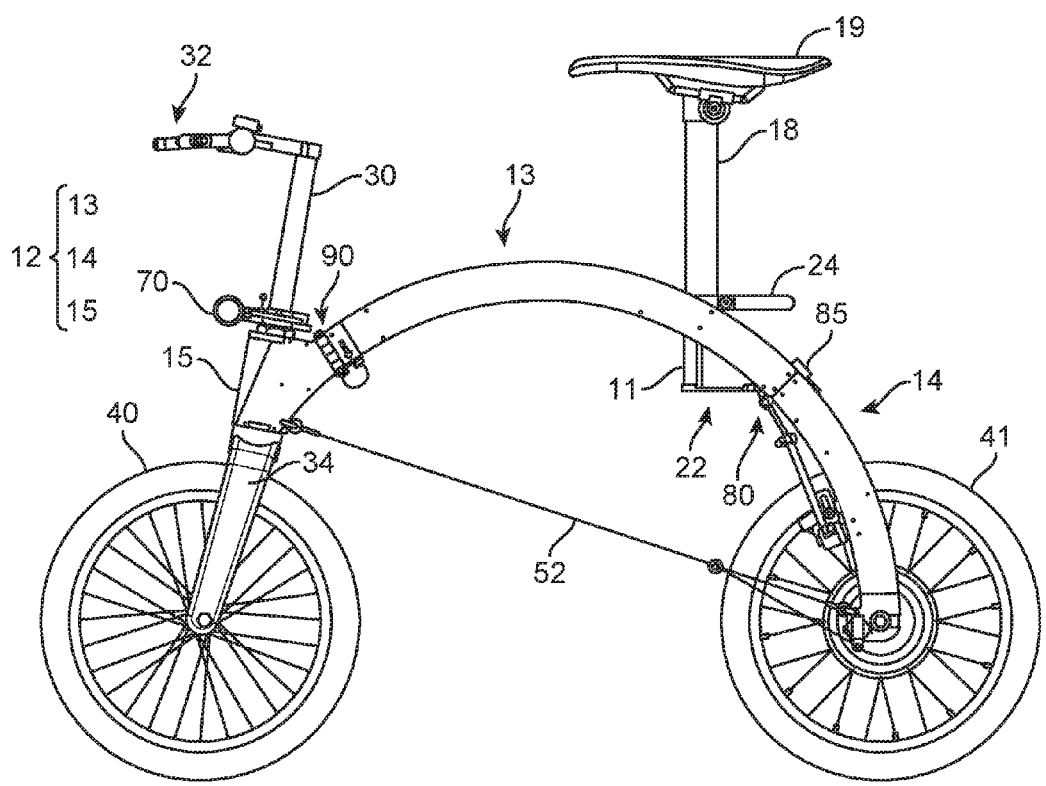
FIG. 3 is a right side view of the electric scooter, in accordance with the present disclosure.
Figure 4:
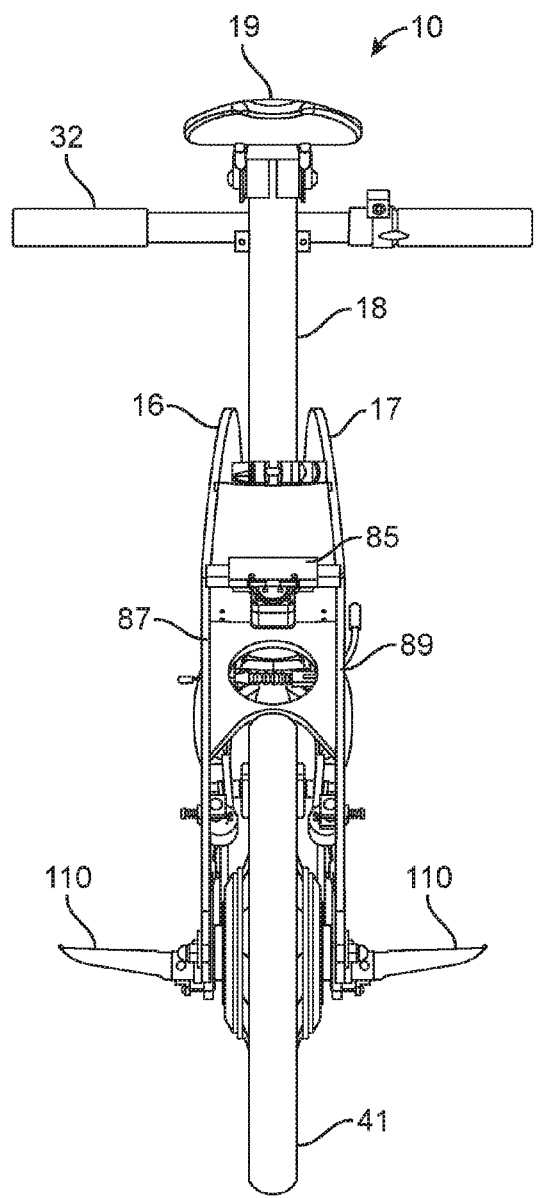
FIG. 4 is a back view of the electric scooter, in accordance with the present disclosure.
Figure 5:
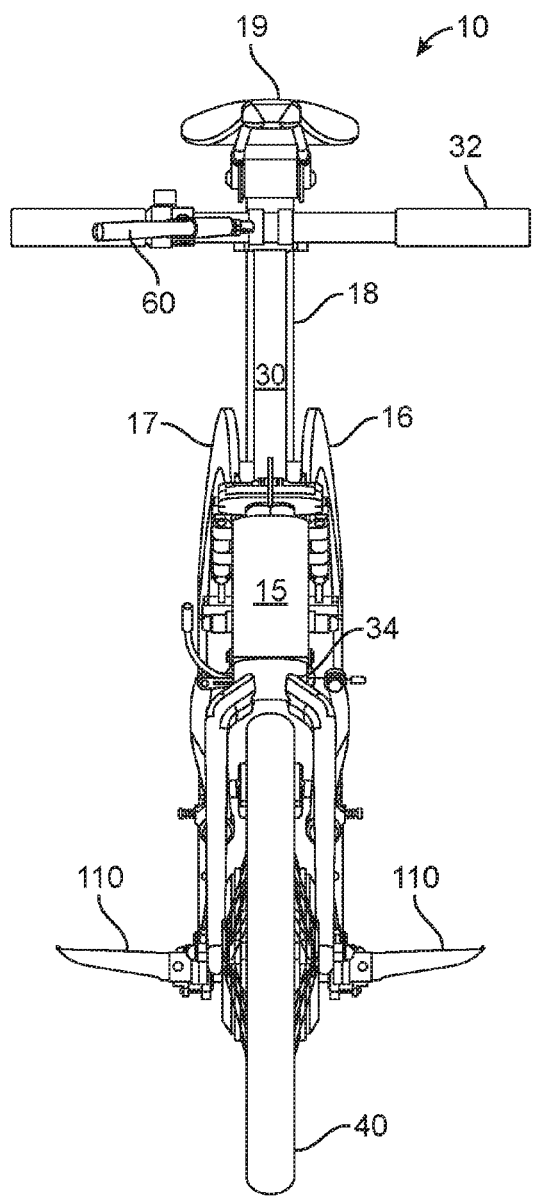
FIG. 5 is a front view of the electric scooter, in accordance with the present disclosure.
Figure 6:
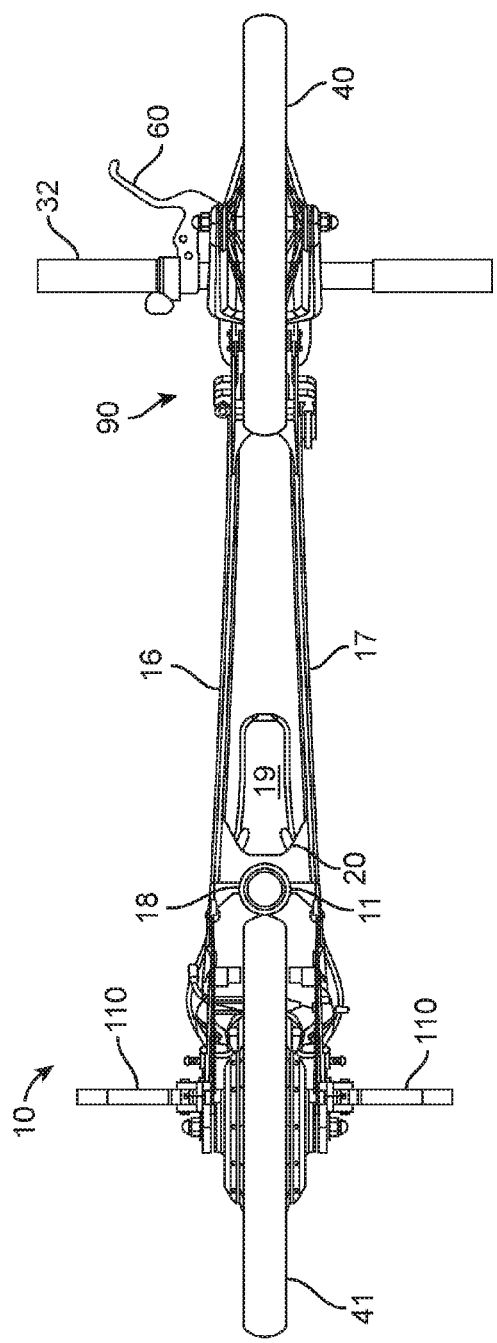
FIG. 6 is a bottom view of the electric scooter, in accordance with the present disclosure.
Figure 7:
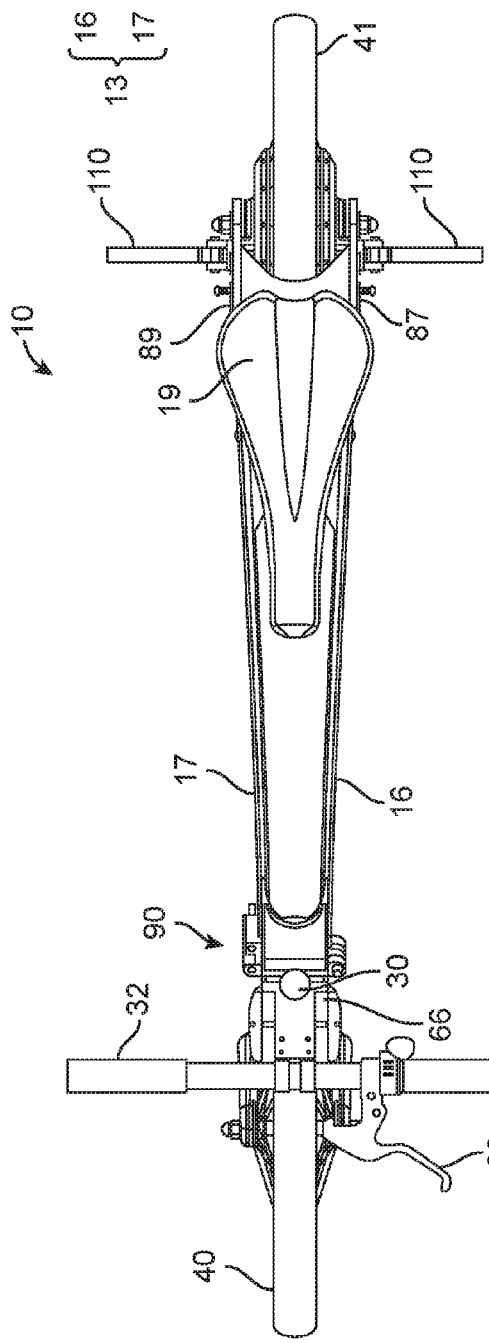
FIG. 7 is a top view of the electric scooter, in accordance with the present disclosure.
Figure 8:
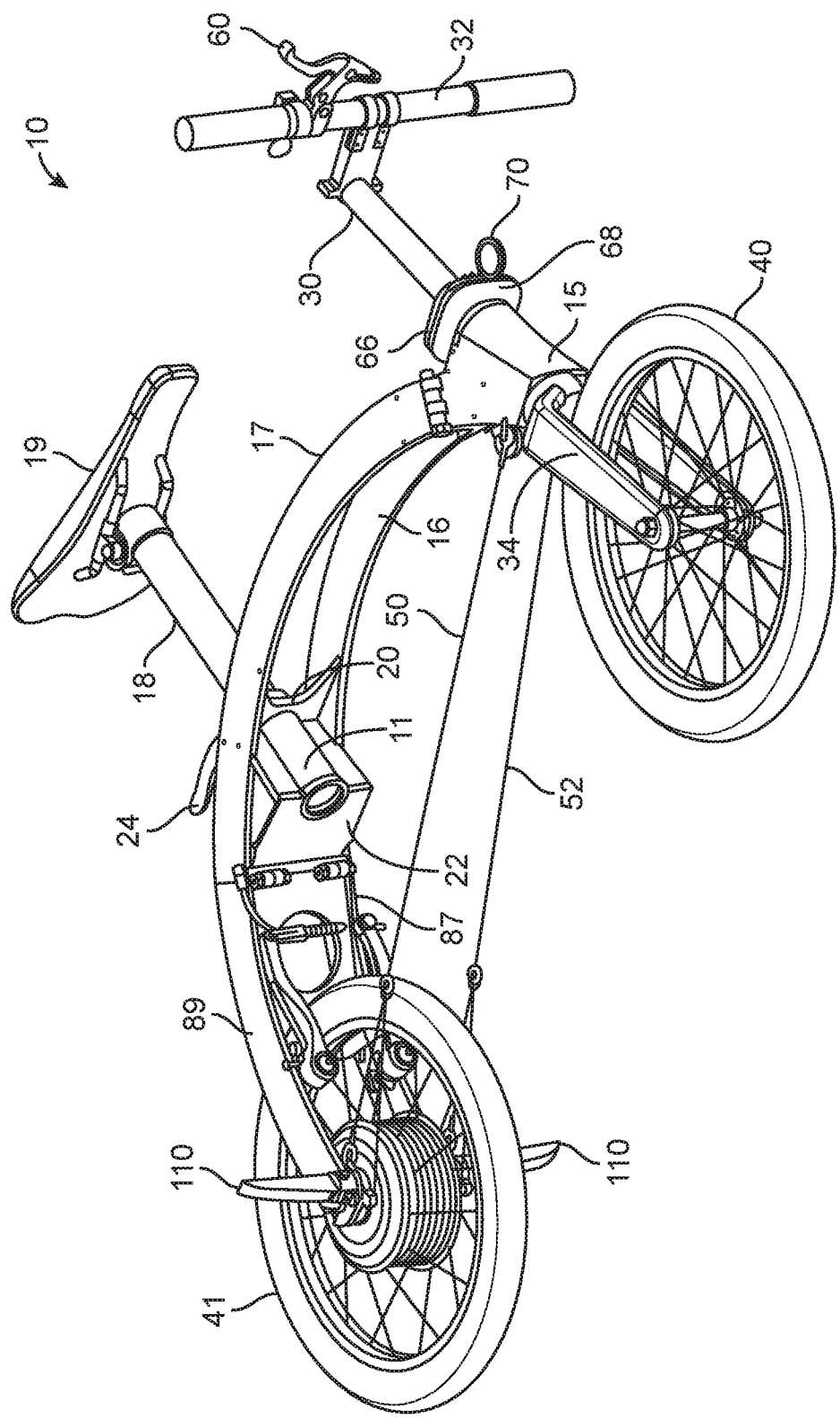
FIGS. 8 and 9 are bottom perspective views of the electric scooter, in accordance with the present disclosure.
Figure 9:
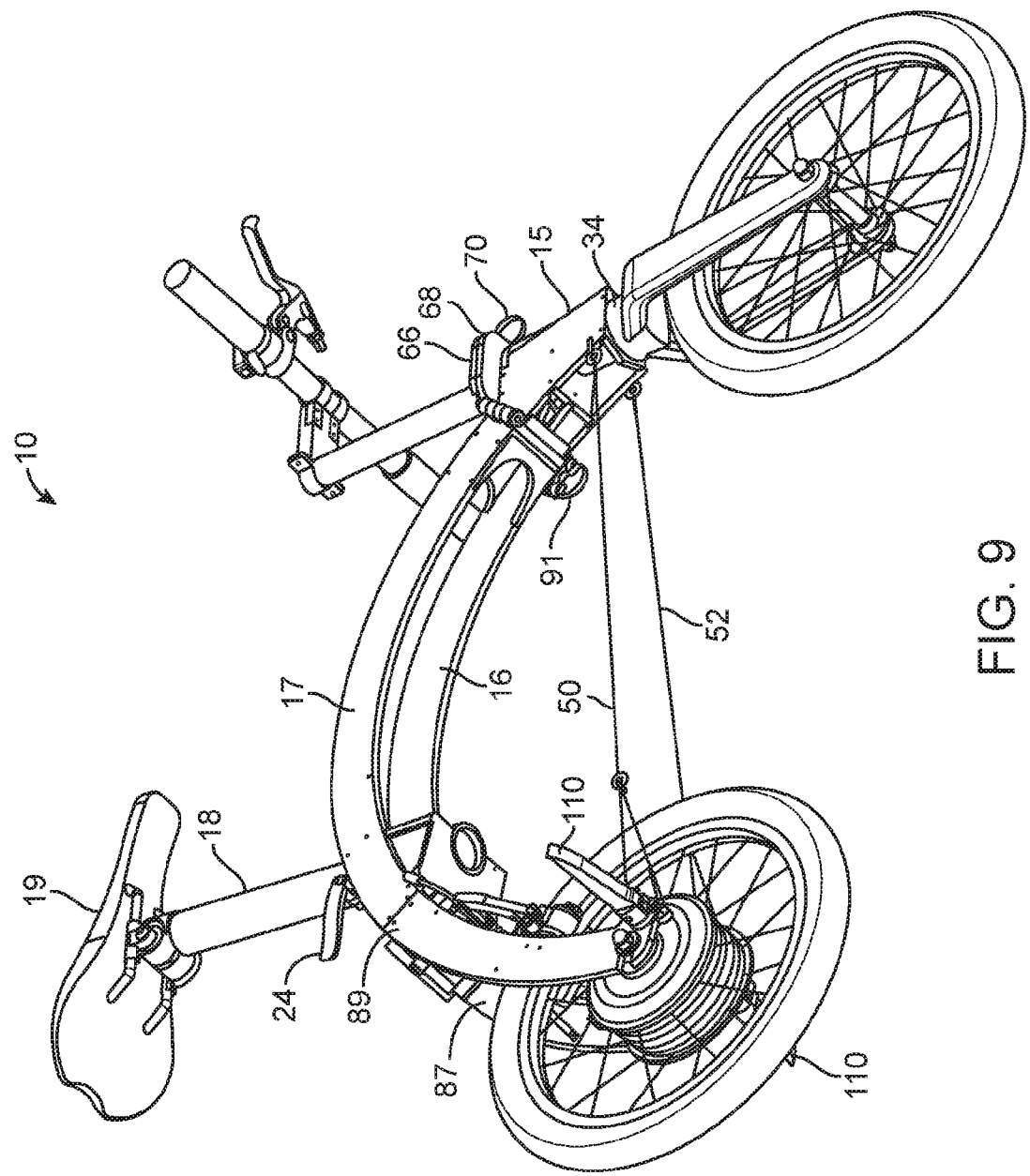
Figure 10:
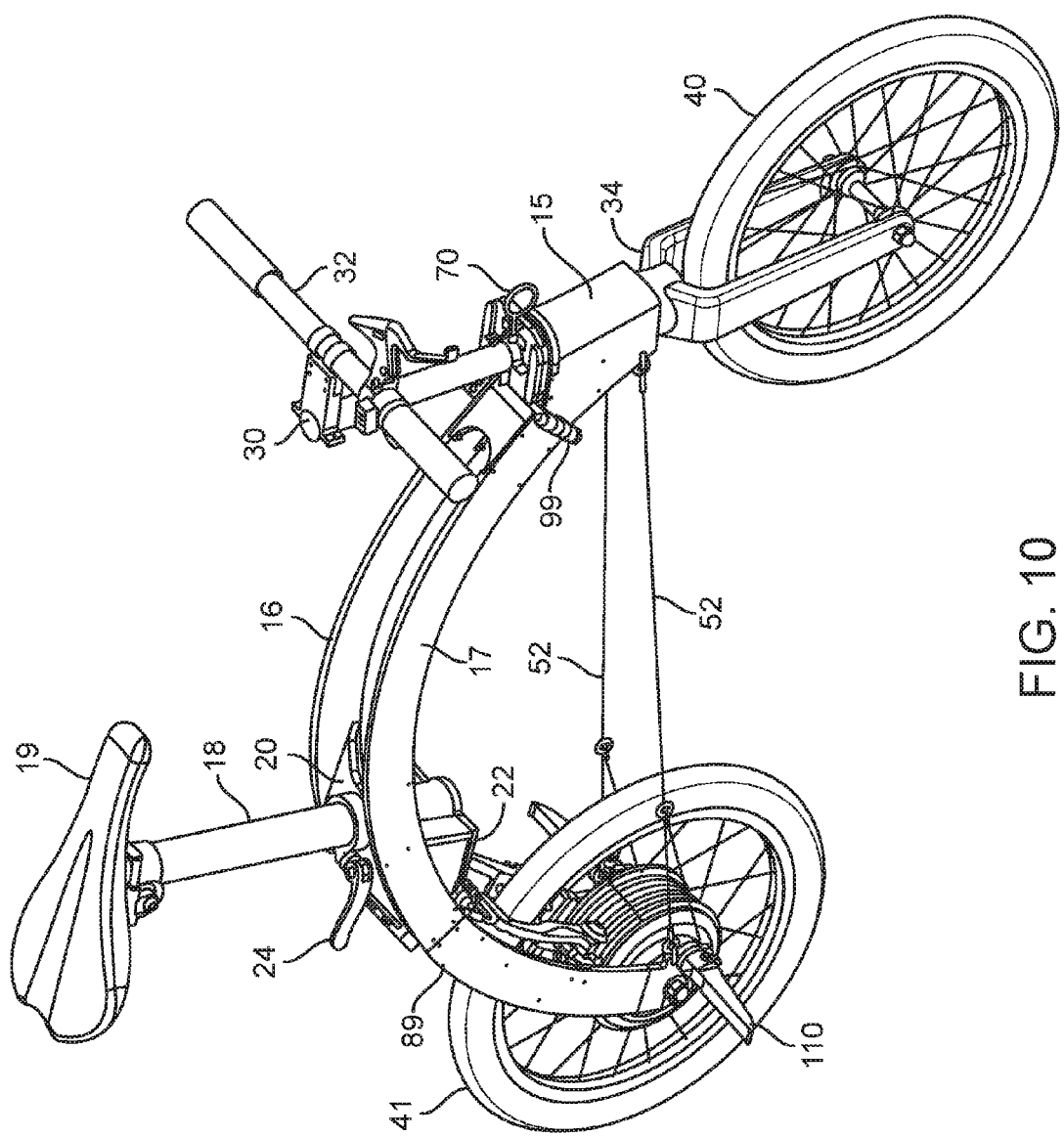
FIGS. 10 and 11A are top perspective views of the electric scooter, in accordance with the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Although the invention is described in conjunction with a scooter, it will be readily apparent to those skilled in the art how the invention can be utilized with a wide variety of other types of powered vehicles to provide electrical assist therefore, e.g., a bicycle.

Referring now to the drawings, wherein the depictions are for the purpose of illustrating certain exemplary embodiments only and not for the purpose of limiting the same, FIG. 1 schematically shows an exemplary drive system 100 for an electric scooter 10 that may help implement the methodologies of the present disclosure.

The exemplary electric scooter 10 includes a user interface 102, a controller 104, a power source 106, and an electric motor 108. The power source 106, e.g., a battery, may be any known energy source including energy generating devices such as solar cells, The controller 104 is electrically connected to the power source 106 and operably connected to the user interface 102. In various embodiments, the user interface 102 is configured to display information associated with operating states of the electric scooter 10, e.g., ON and OFF, and operating states of the various components including the power source 106, e.g., ON, OFF, battery level, and/or a charge ON state or charge OFF state. In one embodiment, the charge ON state may be indicated by a lighting device such as an LED. In one embodiment, the user interface 102 may include an ON/OFF switch for controlling the operating state of the controller 104. In one embodiment, the user interface 102 is accessible via wireless connection by a mobile device, e.g., smartphone, so that a user may selectively control operation and/or monitor operating parameters of the controller 104 and/or power source 106.

The controller 104 may include one or more transformers to preferably modulate and then electrically communicate electrical energy from the power source 106 to the electric motor 108. In various embodiments, the controller 104 is connected to torque signals from a brake input 110 and an accelerator/throttle input 112. In various embodiments, a tail light and/or rear light may be connected and controlled by the controller 104. Similarly, turn signals may be connected and controlled by the controller 104 via one or more switches. In operation, the controller 104 may determine a torque command in accordance with the input signals from the brake and throttle 110 and 112 and thereby control electrical energy flow from the power source 106 to the electric motor 108 based upon the determined torque command.

The power source 106 may be any known electrical energy storage device such as a battery, or any known electrical energy generative device such as solar panels. In various embodiments, the power source 106 is electrically connectable to a standard 115/230-volt AC receptacle for re-charge, as necessary, and configured to selectively electrically communicate electrical energy. In various embodiment, the power source 106 may be removed by a user for replacement, storage, or charging. In various embodiments a second power source may be connected to the power source 106.

The electric motor 108 may be configured to drive a rear wheel axle or a front wheel axle directly or through a transmission mechanism to rotate. The motor is preferably a direct-current motor. In various embodiments, the electric motor 108 may be a stepper motor. The electric motor 108 receives power from a power source 106 that is mounted within the frame assembly and which power is supplied through the controller 104.

In exemplary operation, an amount of electrical power supplied from the power source 106 through the controller 104 to the electric motor 108 is controlled in response to certain inputs including, e.g., a torque signals from the brake input 110 and/or the accelerator/throttle input 112. In various embodiments, a speed sensor may also be used and connected to the controller 104 for providing a speed signal to the control system. In one embodiment, the controller 104 may include a speed governor configured to limit a maximum speed and/or torque input.

FIGS. 2-11A show various views of the electric scooter 10 in an operable, uncollapsed state. A scooter 10 has a scooter frame 12 that includes a main curved frame 13, a rear curved frame 14, and a head frame portion 15. In various embodiments, the frame 12 may be formed of tubes; however, the embodiment as shown is formed of dual, curved frame members 16 and 17 spaced apart. The main curved frame 13 is selectively, pivotally engaged to the rear curved frame 14 and the head frame portion, i.e., a front frame 15, as described in greater detail herein below.

A seat post 18 is moveably positioned within a seat tube 11 of the frame 12. The seat post 18 may slidably or telescopically engage the seat tube 11 at a lower end portion while attached to a seat 19 at an upper end. The seat post 18 may be secured within the seat tube 11 by a mechanical post clamp 24. In one embodiment, a shock-absorber component may be implemented in the seat post 18 for example by a mechanical spring on a top end configured to engage the seat 19. The seat tube 11 is connected to the frame 12 via a bracket 20 or similar. The bracket 20 may be integral to a mount box 22 for a power source, e.g., battery. Embodiments of the bracket 20 may alternatively be formed separately from the mount box 22. The mount box 22 is preferably configured to support and protect the power source and may be attached to the curved frame members 16 and 17.

A steering post or column 30 which connects the handle bars 32 and the fork 34 can be installed in the head frame portion 15. The fork 34 can support the front wheel 40. In various embodiments, the fork 34 may attach to the head frame portion 15 via a shock absorber. The shock absorber can be used to control the amount of movement between the fork 34 may attach to the head frame portion 15 and the rate of change in their relationships. Support cables 50 and 52 connect the head frame portion 15 to the rear curved frame 14. The rear curved frame 14 supports a rear wheel 41.

The electric scooter 10 may be provided with one or two wheel hand brake assemblies in selective operating engagement with one of either a rear or a front wheel rim. The wheel hand brake assembly is selectively actuated by the hand brake lever 60 provided on the handle bar 32. The hand brake lever 60 is connected to either the front or rear wheel hand brake assembly by actuating cables (not shown). In one embodiment, the hand brake lever 60 is configured to provide an electronic signal to the controller 104 during operation.

Although the present invention utilizes traditional hand actuated mechanical brake systems which act upon the wheel rims, it is within the scope of this invention to utilize any type of motorcycle, moped or bicycle braking systems that are well known in the prior art, e.g., disc brakes or drum brakes. Further, while the braking system disclosed herein includes a hand brake lever mechanical cable operated brake system, it is also within the scope of this invention to utilize hand or foot actuated hydraulic, mechanic or electrical powered braking systems in connection therewith which are well known in the prior art. In one embodiment a regenerative braking system may be used wherein forward momentum is captured as electrical energy for storage in the power source 106.

In various embodiments, the throttle input 112 may be incorporated in the handle bar 32. For example, in various embodiments a rubber or other gripping material may be disposed about a throttle sleeve that is coupled to a planet gear configured to revolve around a sun gear or similar. When the grip is rotated, a potentiometer is rotated, sending a signal to the controller 104 indicating a torque request. As known in the art, a spring or other biasing member may be provided in the throttle assembly so that when released, the grip will return to the home position.

Figure 11A:
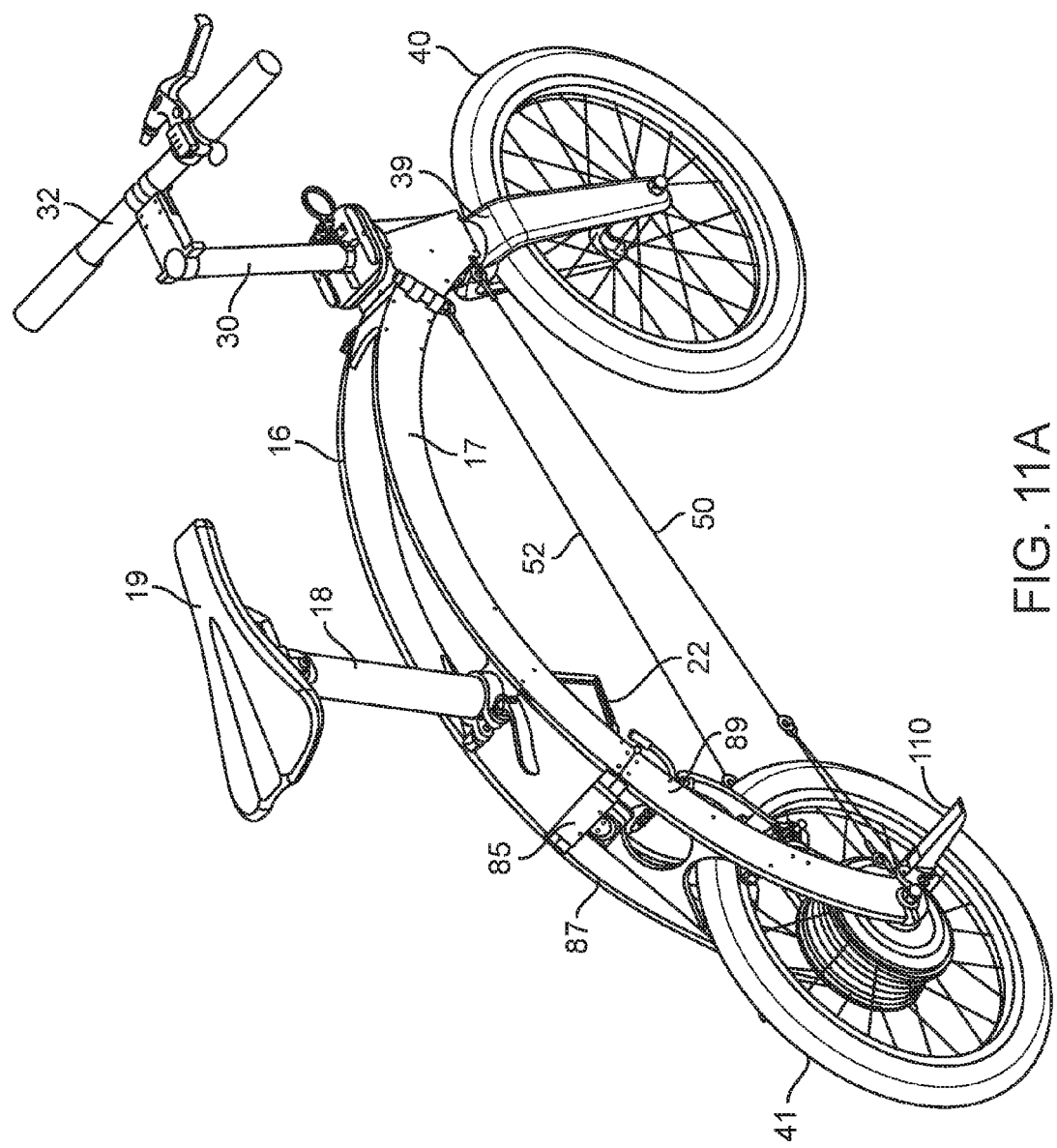
Figure 11B:
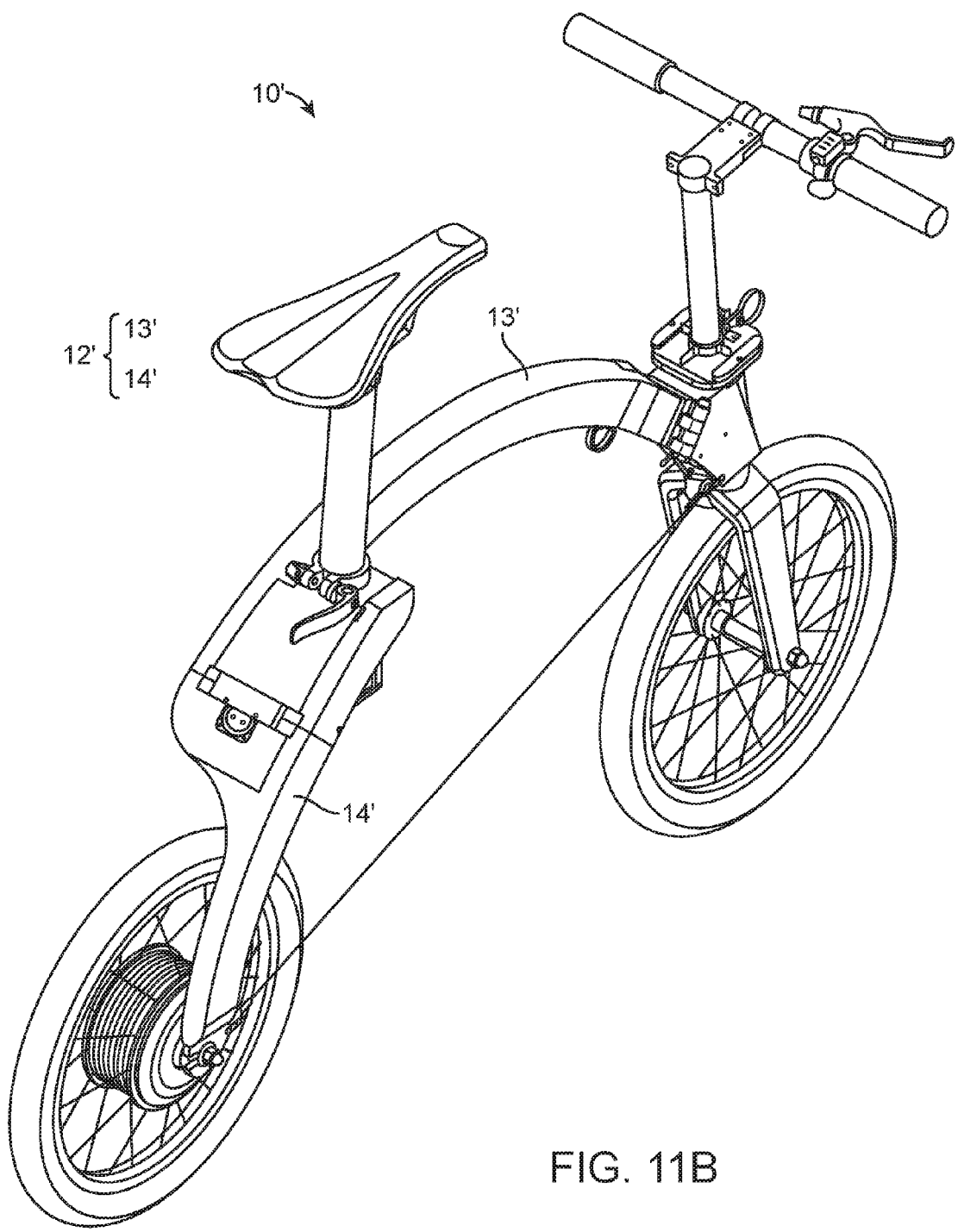
FIG. 11B is a top perspective view of another embodiment of the electric scooter, in accordance with the present disclosure.

FIG. 11B shows an additional embodiment of the electric scooter 10'. As FIG. 11B shows, the electric scooter 10' may include a scooter frame 12' that is formed of a single curved member 13' and a single rear curved frame member 14'. Alternatively, the electric scooter 10' may be formed of a single curved member 13' and a dual curved rear frame 14 as shown in FIG. 11A or the electric scooter 10' may be formed of a single curved rear curved member 14' and a dual main curved frame 13 as shown in FIG. 11A.

Figure 12:
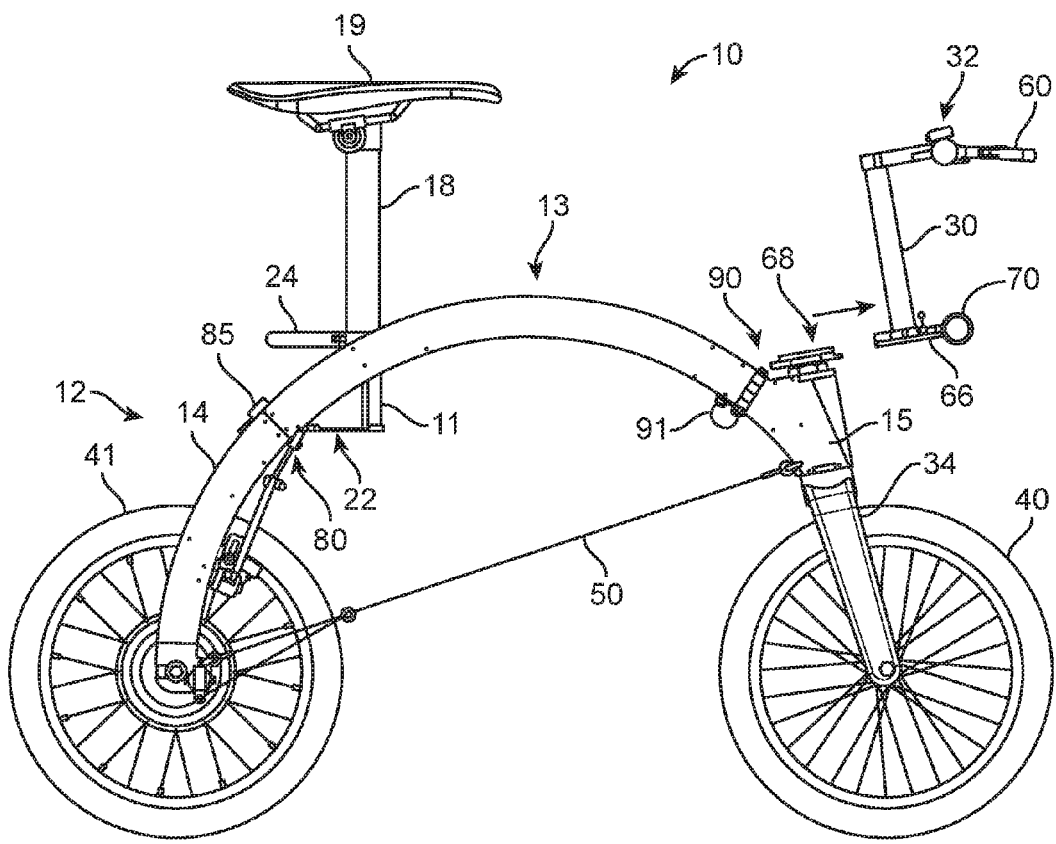
FIG. 12 is a left side view of the electric scooter illustrating selective removal of a handlebar portion, in accordance with the present disclosure.
Figure 13:
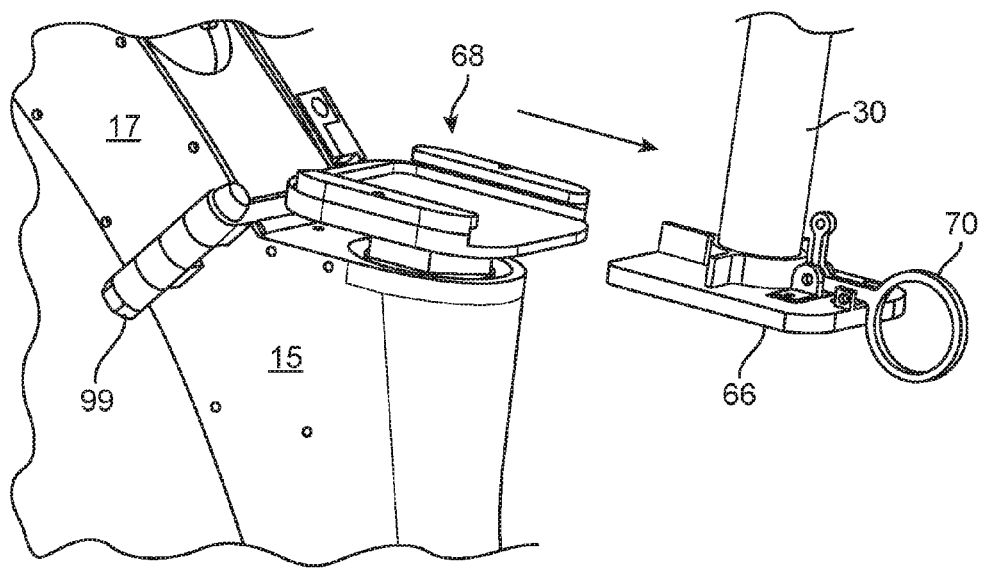
FIG. 13 is an enlarged perspective view of the electric scooter illustrating selective removal of the handlebar portion, in accordance with the present disclosure.
Figure 14:
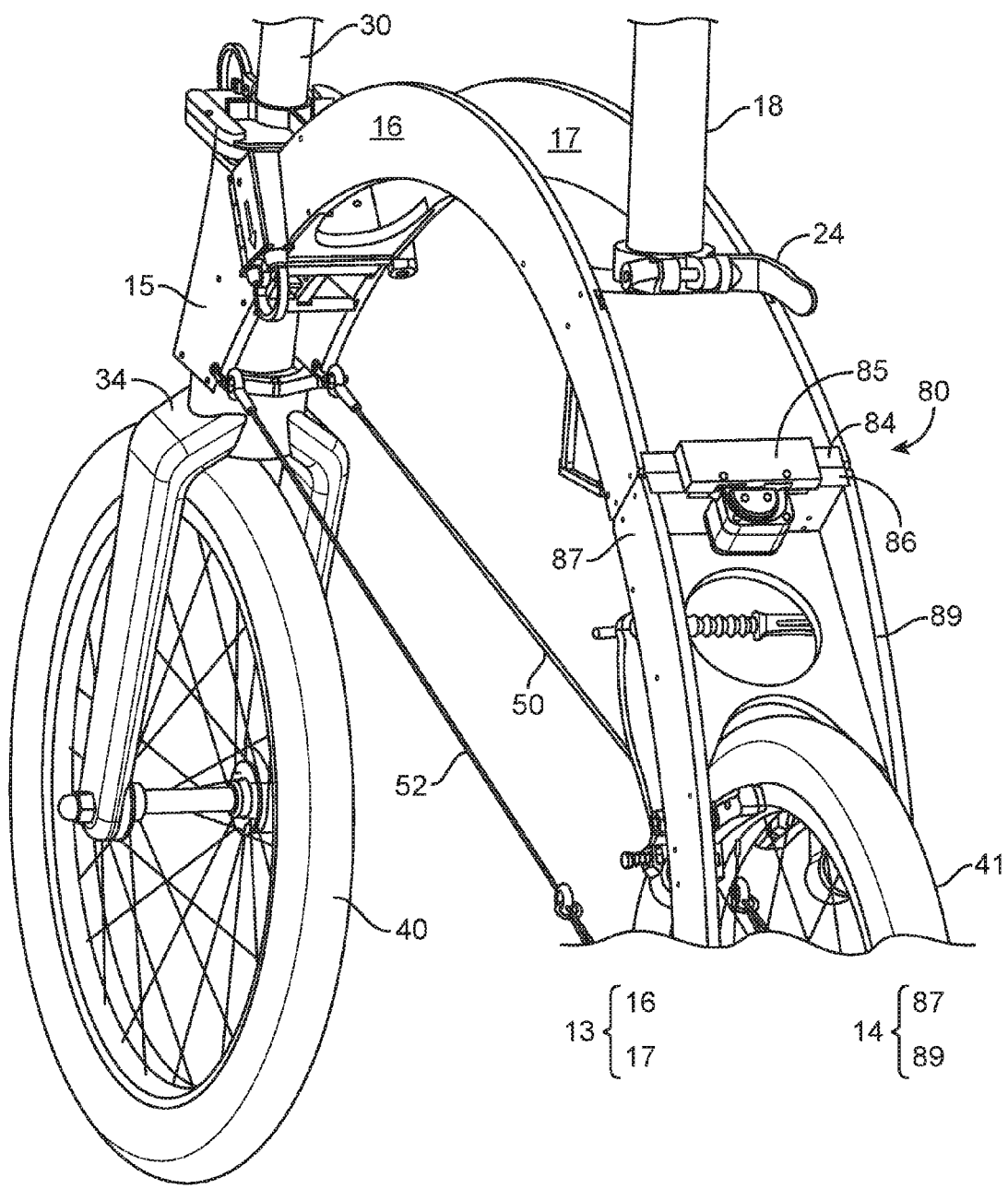
FIGS. 14, 15A and 15B show a rear release module, in accordance with the present disclosure.
Figure 15A:
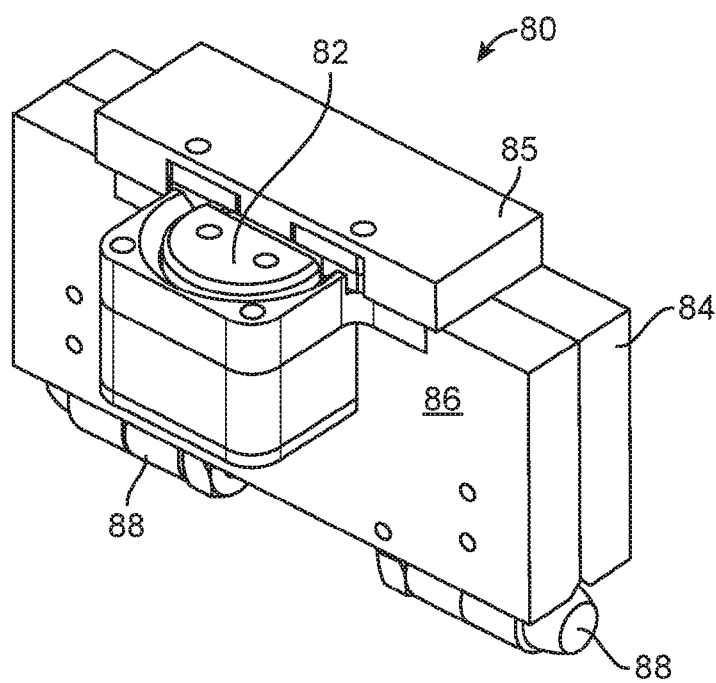
Figure 15B:
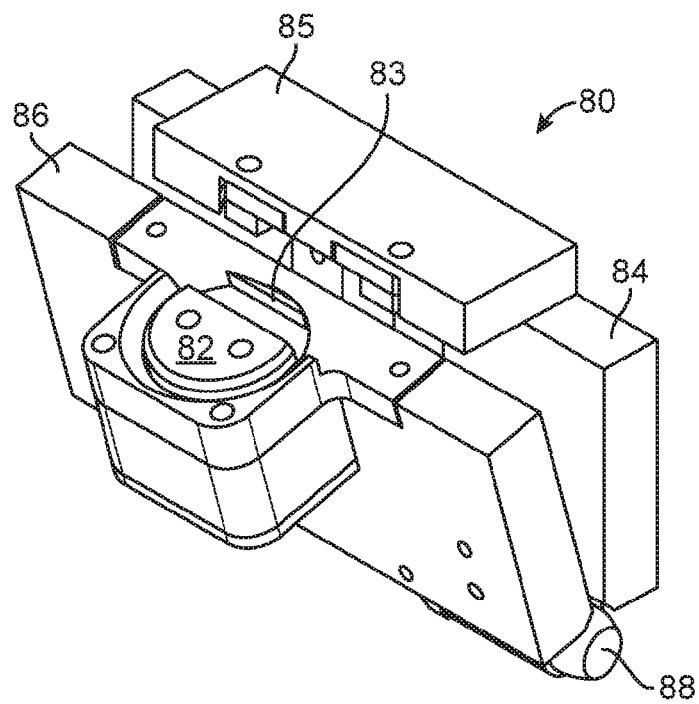
Figure 22:
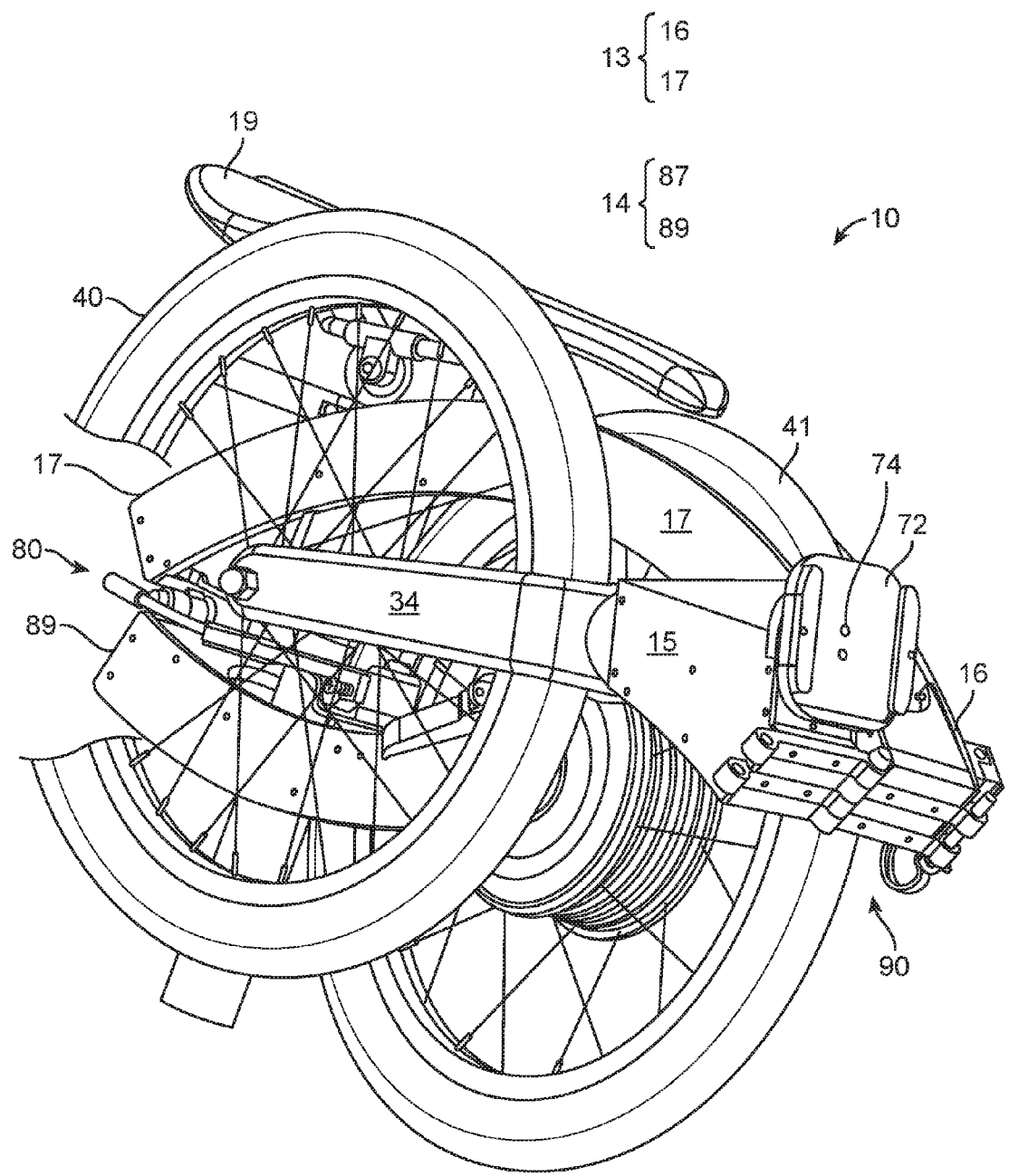
FIG. 22 shows the collapsible scooter in a collapsed state with the handlebar portion removed, in accordance with the present disclosure.

FIGS. 12 and 13 illustrate selective removal of the handle bar 32 from the fork 34 of the electric scooter 10. As FIGS. 12 and 13 show, a bottom end of the handle bar 32 includes a plate 66 configured to couple to an elongate T-shaped slot 68, i.e., a T-slot, positioned on a top end of the fork 34. The plate 66 is secured in the t-shaped slot 68 via a pin 70. The pin 70 may be a mechanical spring-pin lock. When manually actuated, pins are released or extended into one or more recesses 74 of a bottom surface 72 of the T-shaped slot 68, such as shown in FIG. 22.

FIGS. 14-16C illustrate a rear release module 80 of the electric scooter 10. As FIGS. 14-16C show, the rear release module 80 includes a first plate 84 attached to the curved frame 13 between the curved frame members 16 and 17. A second plate 86 is attached to the rear curved frame 14 between members 87 and 89. The first and second plates 84 and 86 are joined together by a hinge 88. The rear release module 80 includes a push-button 82 having an engaging tab 83 connected thereto, preferably integrally. The push-button may be supported within the rear release module 80 by a biasing member such as a spring. The tab 83 is preferably slopped as shown, but may be flat. When in a locked position such as shown in FIG. 15A, the push-button 82 is in extended state with the tab 83 engaging a recess on an underside of a locking block 85. The locking block 85 is connected to the plate 84, preferably integrally. The recess is preferably sized and shaped to securely accept the tab 83.

Figure 16A:
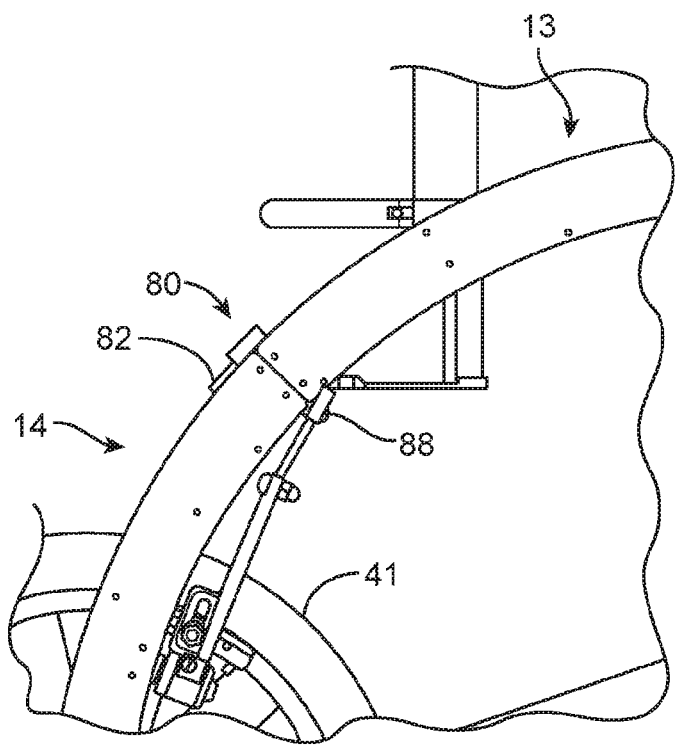
FIGS. 16A-16C show the rear release module in operation, in accordance with the present disclosure.
Figure 16B:
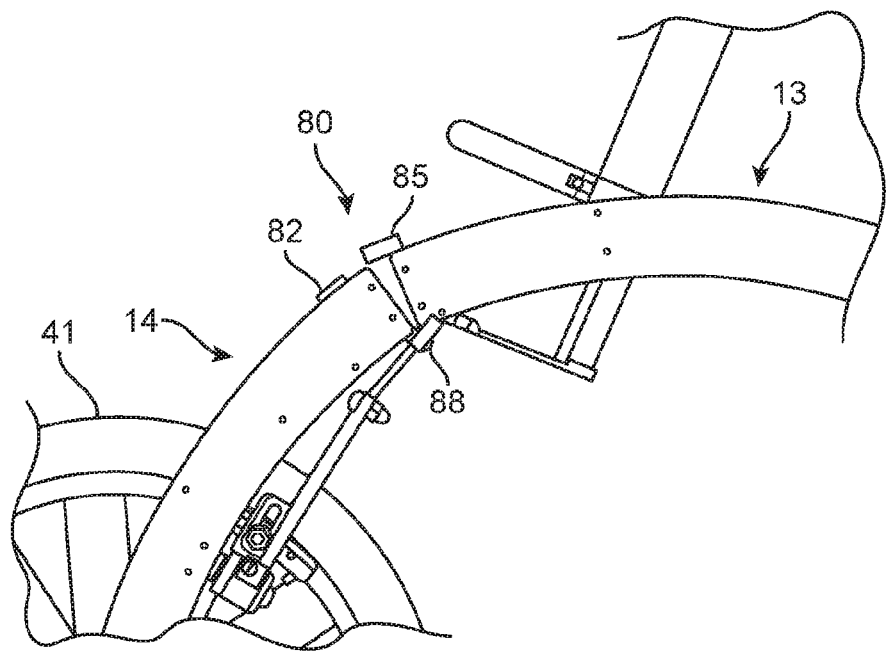
Figure 16C:
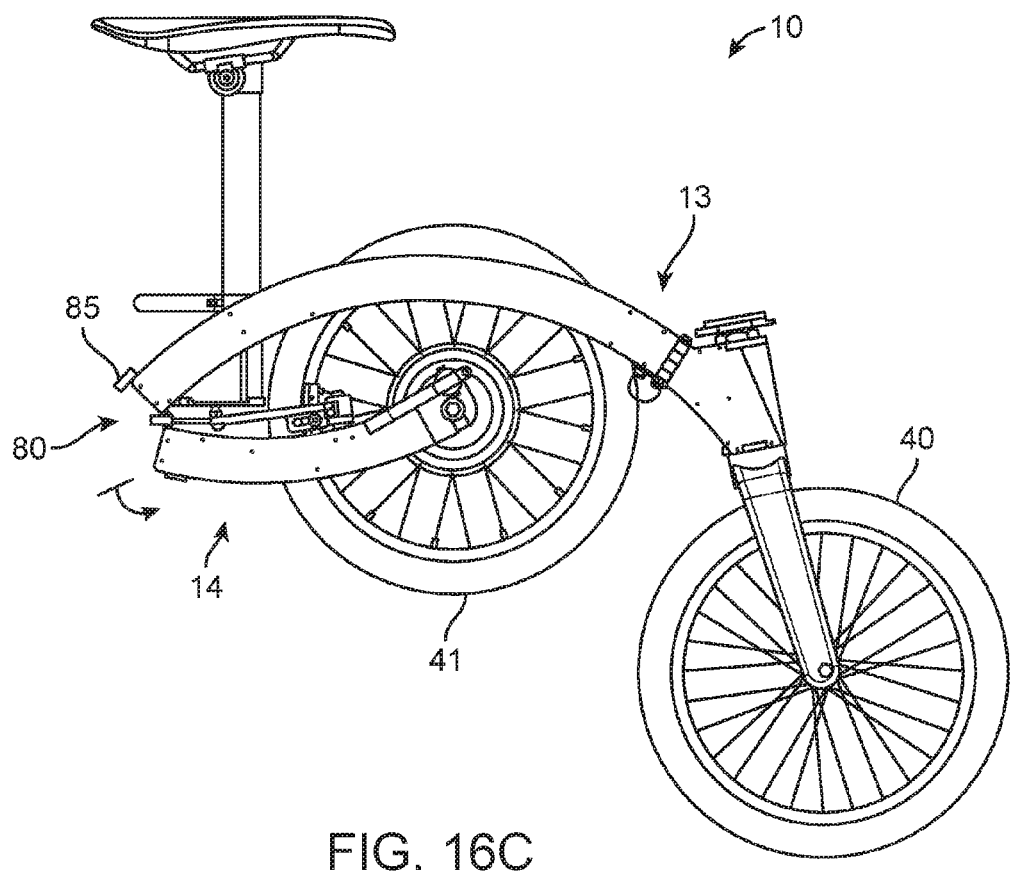

In operation, a user-operator may depress the push-button 82 to disengage the tab 83 from the recess on the underside of the locking block 85. After the tab 83 disengages, the plates 84 and 86 separate, rotating about the hinge 88 as shown in FIGS. 16B and 16C. In this way, the rear wheel 41 may fold into the curved frame 13 for compact storage. Similarly, to engage the tab 83 to the underside of the locking block 85, the user-operator may simply pivot the rear curved frame 14 and/or the rear wheel 41 until the plates 84 and 86 are parallel or near parallel. In one embodiment, the slope of the top end of the tab 83 depresses the push-button 82 and the tab when engaging the locking block 85. In this way, the user-operator may simply rotate the rear curved frame 14 and/or the rear wheel 41 until the tab 83 engages the recess automatically. In various embodiments, the user-operator will hear and/or feel a 'click' upon engagement. Testing the engagement strength may simply be made by attempting to rotate the rear curved frame 14 and/or the rear wheel 41 to the stored position. Upon failing to rotate, the user-operator can conclude the rear release module 80 is secured.

Figure 17:
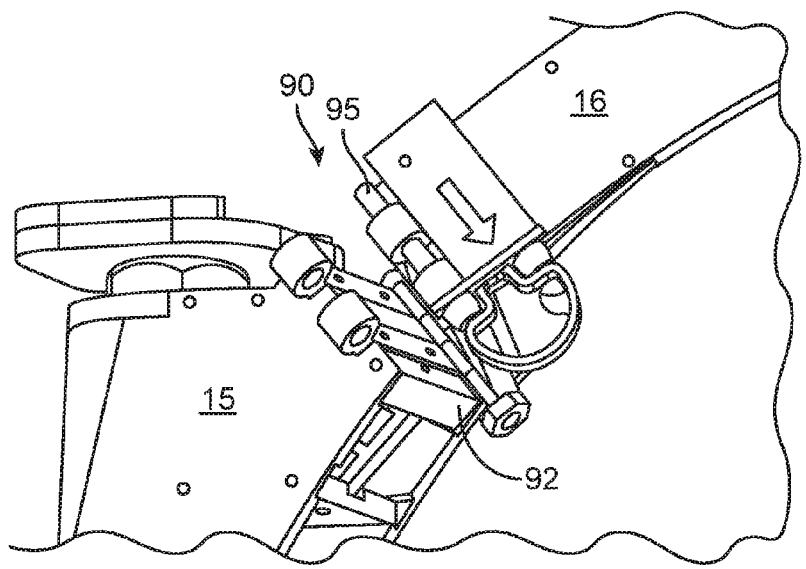
FIGS. 17, 18A and 18B show a front release module, in accordance with the present disclosure.
Figure 18A:
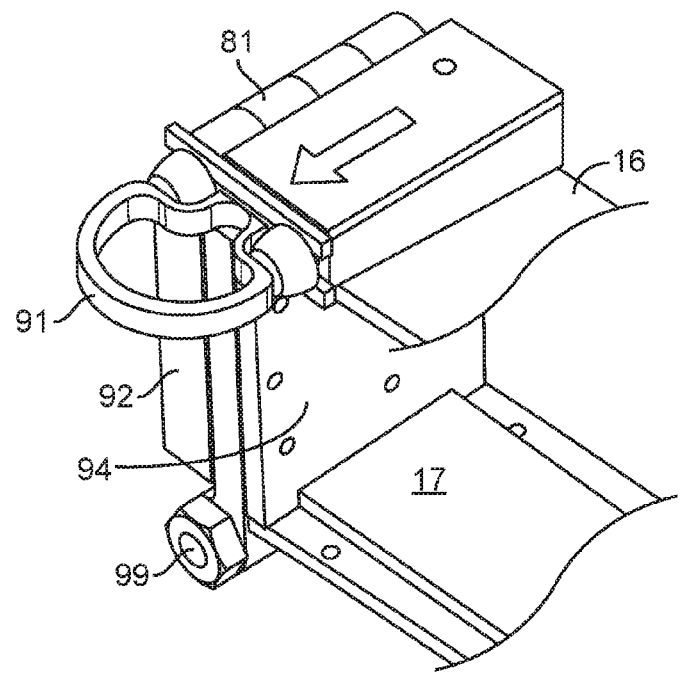
Figure 18B:
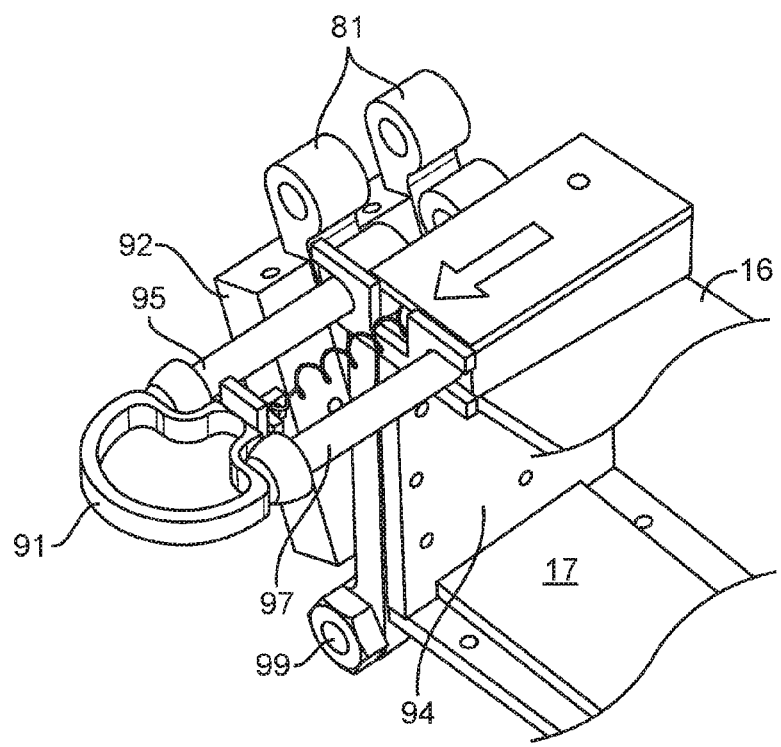

FIGS. 17, 18A and 18B show a front release module 90 of the electric scooter 10. As FIGS. 17, 18A and 18B show, the front release module 90 includes a first plate 92 attached to the fork 34 and a second plate 94 attached to the curved frame 13 between the curved frame members 16 and 17. The first and second plates 92 and 94 are joined together by a hinge 99. The front release module 90 includes a latch 91 for selective engagement/disengagement of the plates 92 and 94. The latch 91 includes a spring 93 to bias the latch 91 in a home position, so that when pulled into a disengaging position, the latch 91 will return to the home position (locking position) when released. Further, the spring 93 ensures that the latch 91 is in the locking position when desired, such as during use. The latch 91 includes a locking member 95 and a guiding member 97. The locking member 95 is sized and adapted for engagement within one or more cylindrical receiving knuckles 81 and configured, in one embodiment, to prevent the latch 91 from complete removal from the knuckles 81.

Figure 21:
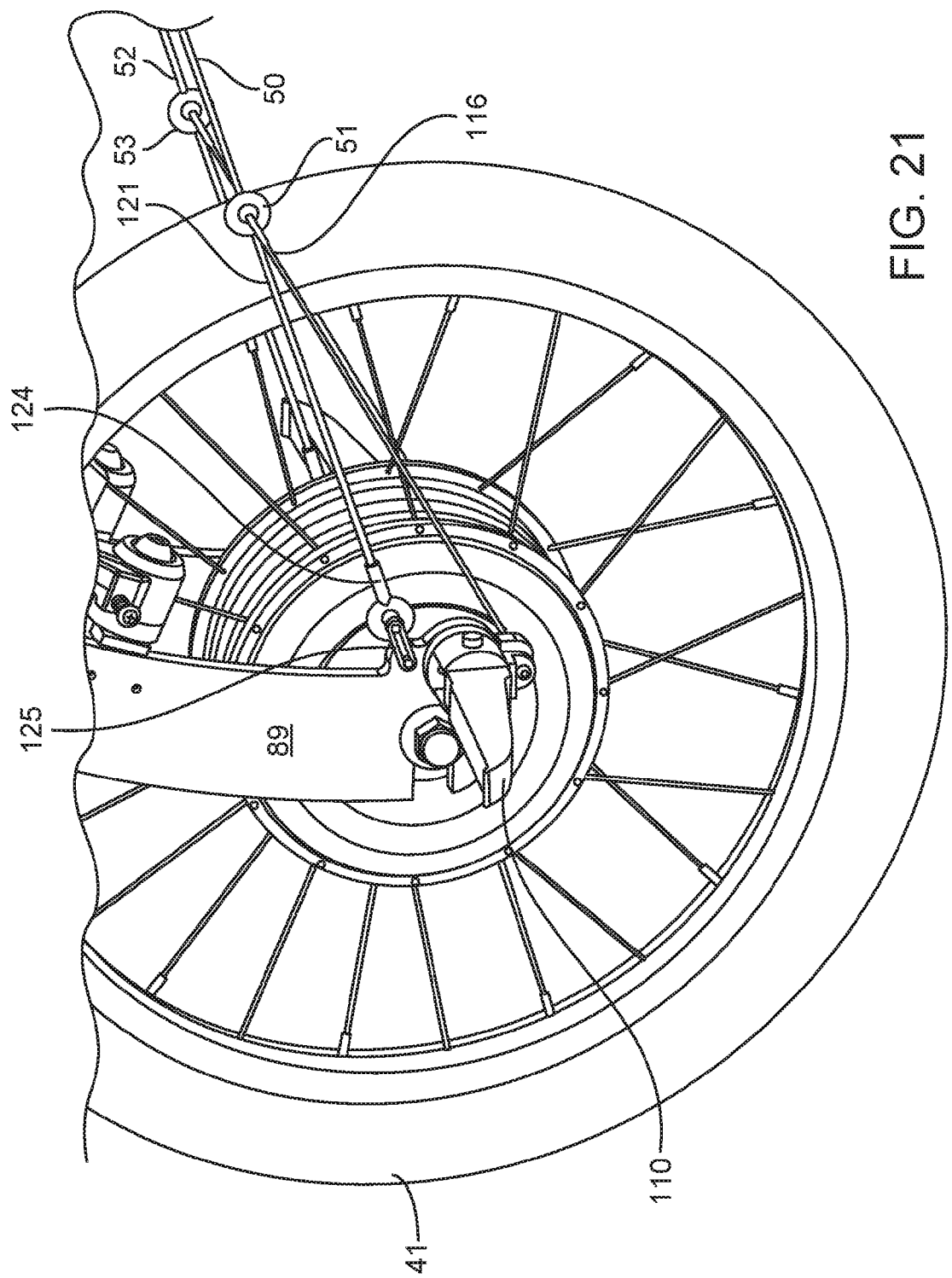
FIG. 21 shows a partial view of the electrical scooter, in accordance with the present disclosure.

In operation, a user-operator may pull the latch 91 from a home position as shown in exemplary FIG. 18A to a release position as shown in exemplary FIG. 18B, thereby separating plates 92 and 94. Separating the plates 92 and 94 enables the fork 34 and front wheel 40 to swing about the hinge 99 to a position such as shown in FIG. 21. In this way, the front wheel 40 may fold aside the curved frame 13 for compact storage.

Similarly, to engage the reengage the fork 34 to the curved frame 13, the user-operator may simply pivot the fork 34 and/or the front wheel 40 until the plates 92 and 94 are parallel or near parallel. Thereupon the user-operator may engage the latch 91 by pulling to the release position and then positioning the locking member 95 into the cylindrical receiving knuckles 81 by releasing the latch 91.

Figure 19A:
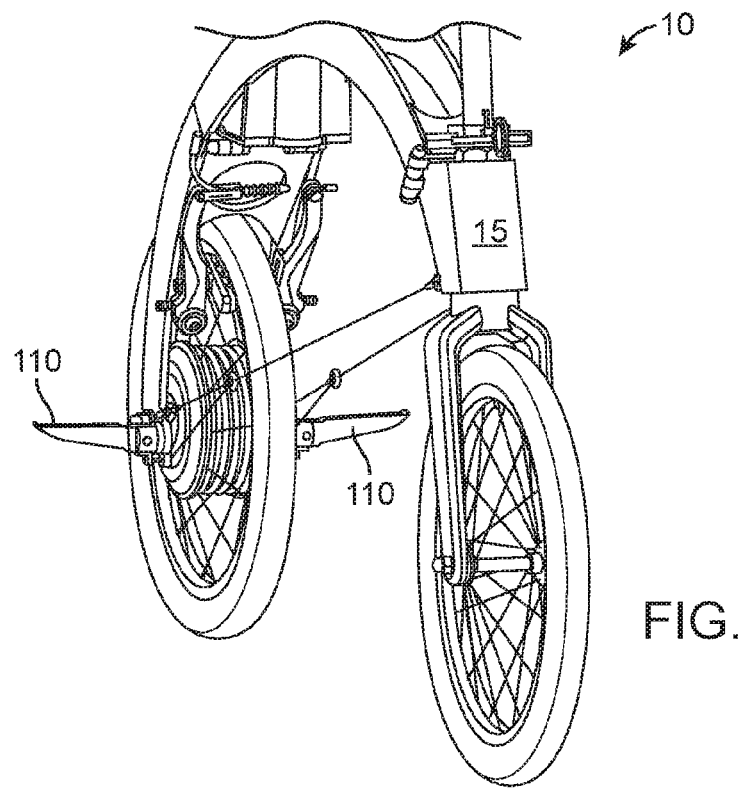
FIGS. 19A, 19B, 20A, and 20B show a rear peg in operation, in accordance with the present disclosure.
Figure 19B:
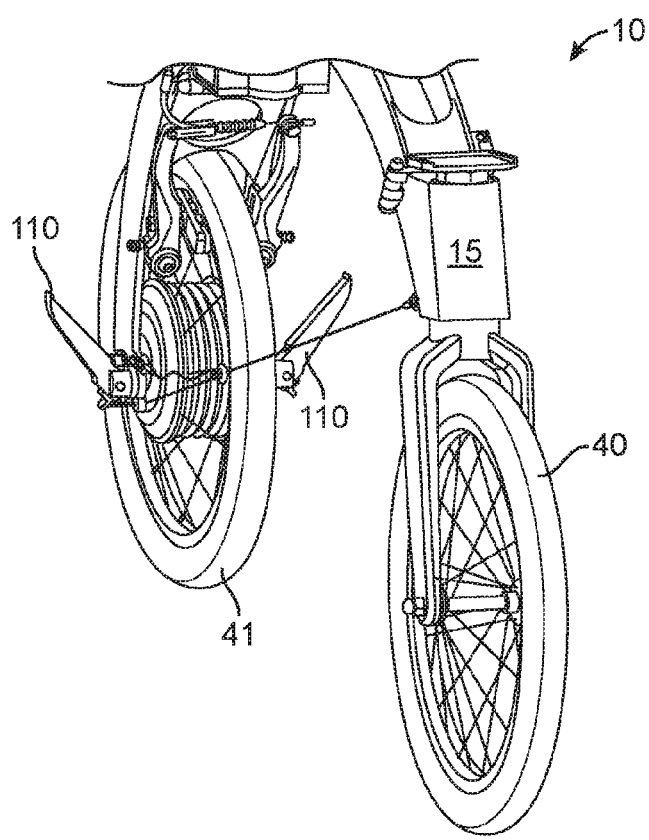
Figure 20A:
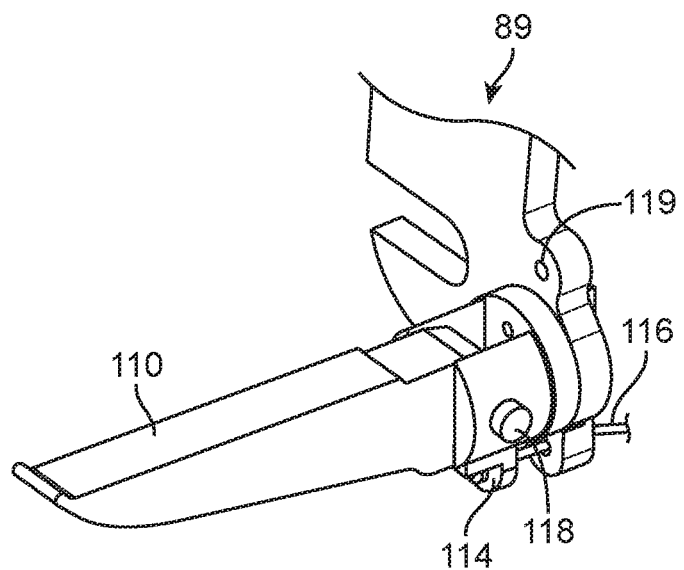
Figure 20B:
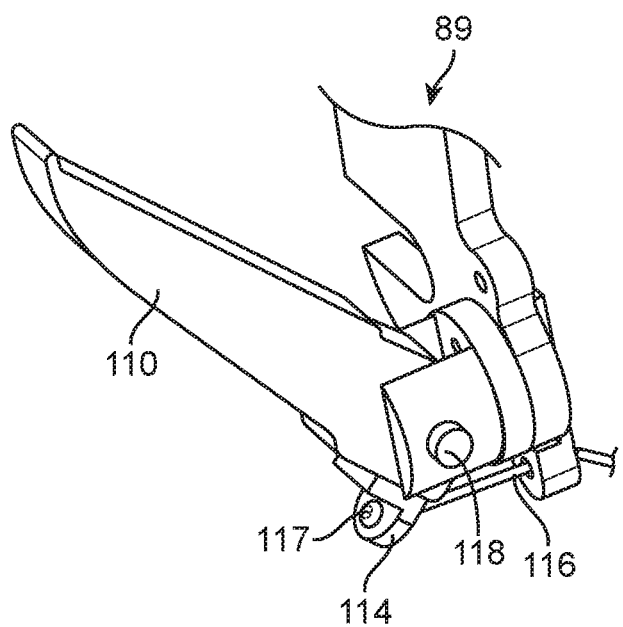

FIGS. 19A-20B show a pair of exemplary rear pegs 110 that may be included on various embodiments of the electric scooter 10. FIGS. 19A and 20A show the pegs 110 in an extended position configured to support a load, while FIGS. 19B and 20B show the pegs 110 retracting into a storage position. As FIGS. 19A-20B show, the pegs 110 are configured to support a load such as legs and feet of a user, i.e., a foot rest. In various embodiments, pegs 110 may additionally be similarly included on the fork 34. In one embodiment, the pegs 110 are attached to one of the curved frame members and 87 and 89 and configured to fit and configured for securement to a wheel axle assembly such as by a nut or other mechanical fastener.

The pegs 110 are configured to rotate about a pin or bolt 118 for storage or for use. In one embodiment, the pegs 110 are spring loaded and configured to fold up to the storage position when not in tension with the cables 50 and 52. The pegs 110 preferably include a second bracket 114 configured to both receive a second support cable 116 that includes a terminating end 117. Threading of the support cable 116 into the bracket 114, controls rotation of the pegs 110. In one embodiment, the second bracket 114 includes an aperture 119 for receiving one of the support cables. Tension from one of the support cables 50 and 52 keeps the peg 110 in the extended position, while slack in the support cables 50 and 52, such as when the fork is swung in the storage position, enables the pegs 110 to transition to the storage position.

FIG. 21 shows a partial enlarged view of the peg 110 illustrating an embodiment of cabling near the rear wheel 41. As FIG. 21 shows, the cables 50 and 52 are connected to rings 51 and 53, respectively. The aperture 119 can receive a terminating end 124 of a support cable 121 which may be formed into or attached to a pivoting mechanical fastener 125.

FIG. 22 shows the collapsible scooter 10 in a collapsed state with the handlebar portion 34 removed to illustrate rotation of the concaved-shaped rear frame 14 and the front frame portion 15 connected to the front wheel 40 and fork 34. As FIG. 21 shows, the concaved-shaped rear frame 14 hingebly rotates about a first axis, while the front frame portion 15 hingebly rotates about a second axis. The first and second axis are substantially perpendicular to one another. As described herein above, the concaved-shaped rear frame 14 selectively, hingebly rotates with respect to the concaved-shaped center frame 13 via the rear release module 80, while the front frame portion 15 selectively, hingebly rotates with respect to the concaved-shaped center frame 13 via the front release module 90.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. A collapsible scooter comprising:
   a center frame;
   a first frame hingebly attached to the center frame about a first axis;
   a second frame portion hingeably attached to the center frame about a second axis perpendicular to the first axis, wherein the center frame is concaved-shaped and comprises a first curved member and a second curved member spaced apart to define an opening therebetween so that a first wheel attached to the first frame may selectively rotate into the opening; and
   support cables coupled at a first end to the second frame portion and at a second end to the first frame.

2. The collapsible scooter of claim 1, further comprising:
   a handle bar secured to a post column removeably secureable to the second frame portion.

3. The collapsible scooter of claim 1, wherein the first frame is concaved-shaped and is selectively secured to the center frame using a push button having a tab configured to selectively couple to a recess.

4. The collapsible scooter of claim 3, wherein the tab is integrally connected to the push-button and wherein the push-button is supported within a module having a biasing member aligned to engage the tab with the recess.

5. The collapsible scooter of claim 1, wherein the second frame portion is hingebly attached to the center frame at the first curved member.

6. The collapsible scooter of claim 5, wherein the second frame portion is selectively attached to the center frame at the second curved member.

7. The collapsible scooter of claim 5, wherein the second frame portion is selectively attached to the center frame with a biased latch.

8. The collapsible scooter of claim 1, wherein the support cables comprise a first support cable connected to a first side of the second frame portion and a second support cable connected to a second side of the second frame portion, wherein the first support cable is further connected to a first peg and the second support cable is further connected to a second peg.

9. The collapsible scooter of claim 8, wherein the first and second support cables are connected to the first and second pegs in a manner to secure the pegs in an extended position.

10. An electric collapsible scooter comprising:
    a concaved-shaped center frame comprising a first curved member and a second curved member spaced apart to define an opening therebetween;
    a concaved-shaped rear frame hingebly attached to the center frame about a first axis;
    a front frame portion hingeably attached to the center frame about a second axis perpendicular to the first axis;
    support cables coupled at a first end to the front frame portion and at a second end to the rear frame;
    a power source housed between the first curved member and the second curved member; and
    an electric motor coupled to a rear wheel assembly.

11. The scooter of claim 10, further comprising:
    a handle bar secured to a post column removeably secureable to the front frame portion.

12. The scooter of claim 10, wherein the rear frame is selectively secured to the center frame using a push button having a tab configured to selectively couple to a recess.

13. The scooter of claim 12, wherein the tab is integrally connected to the push-button and wherein the push-button is supported within a module having a biasing member aligned to engage the tab with the recess.

14. The scooter of claim 10, wherein the front frame portion is hingebly attached to the center frame at the first curved member.

15. The collapsible scooter of claim 14, wherein the front frame portion is selectively attached to the center frame at the second curved member.

16. The collapsible scooter of claim 14, wherein the front frame portion is selectively attached to the center frame with a biased latch.

17. The collapsible scooter of claim 10, wherein the support cables comprise a first support cable connected to a first side of the front frame portion and a second support cable connected to a second side of the front frame portion, wherein the first support cable is further connected to a first peg and the second support cable is further connected to a second peg.

18. The collapsible scooter of claim 17, wherein the first and second support cables are connected to the first and second pegs in a manner to secure the pegs in an extended position.

19. An electric collapsible scooter comprising:
    a concaved-shaped center frame comprising a first curved member and a second curved member spaced apart to define an opening therebetween;
    a concaved-shaped rear frame hingebly attached to the center frame about a first axis, wherein the rear frame is selectively secured to the center frame using a biased push button having a tab configured to selectively couple to a recess;
    a front frame portion hingeably attached to the center frame about a second axis perpendicular to the first axis, wherein the front frame portion is hingebly attached to the center frame on the first curved member, wherein the front frame portion is selectively securably attached to the center frame at the second curved member with a biased latch;
    a handle bar secured to a post column removeably securable to the front frame portion;
    support cables coupled at a first end to the front frame portion and at a second end to the rear frame along a rear wheel assembly;
    a first and second peg connected to the support cables in a manner to secure the pegs in an extended position when the front frame portion is secured to the center frame;
    a power source housed between the first curved member and the second curved member; and
    an electric motor coupled to a rear wheel assembly.

* * * * *